United States Patent
Moon

(10) Patent No.: US 7,576,819 B2
(45) Date of Patent: Aug. 18, 2009

(54) LIQUID CRYSTAL DISPLAY DEVICE

(75) Inventor: Sung Hoon Moon, Ulsan-si (KR)

(73) Assignee: Samsung Mobile Display Co., Ltd., Suwon-si, Gyeonggi-do (KR)

(*) Notice: Subject to any disclaimer, the term of this patent is extended or adjusted under 35 U.S.C. 154(b) by 310 days.

(21) Appl. No.: 11/528,549

(22) Filed: Sep. 28, 2006

(65) Prior Publication Data
US 2007/0076151 A1   Apr. 5, 2007

(30) Foreign Application Priority Data
Sep. 30, 2005   (KR) .................. 10-2005-0092317

(51) Int. Cl.
  *G02F 1/1335* (2006.01)
(52) U.S. Cl. .................. 349/117; 349/120; 349/121
(58) Field of Classification Search .................. 349/117, 349/141, 187, 119–121
  See application file for complete search history.

(56) References Cited

U.S. PATENT DOCUMENTS

| 5,150,237 | A | 9/1992 | Iimura et al. | |
| 6,621,551 | B2* | 9/2003 | Matsuzawa | 349/187 |
| 6,922,219 | B2 | 7/2005 | Jin et al. | |
| 2005/0012883 | A1 | 1/2005 | Umeda et al. | |
| 2005/0128411 | A1* | 6/2005 | Nagai et al. | 349/141 |
| 2006/0072056 | A1* | 4/2006 | Nagai et al. | 349/117 |

FOREIGN PATENT DOCUMENTS

| JP | 02-047629 | 2/1990 |
| JP | 03-116015 | 5/1991 |
| JP | 10228016 A * | 8/1998 |
| JP | 2005-208414 | 8/2005 |
| KR | 10-2003-0058092 | 7/2003 |
| KR | 10-2004-0016383 A | 2/2004 |
| KR | 10-2005-0008500 | 1/2005 |

OTHER PUBLICATIONS

Takahashi, Taiju, et al, "Achromatic Liquid Crystal Display Using Homogeneously Oriented Nematics with a Compensation Layer," Electronics & Communications in Japan, Part II—Electronics, vol. 74, No. 8, pp. 46-52, (Aug. 1, 1991).
Yamauchi, S., et al., "Homeotropic-Alignment Full-Color LCD," SID International Symposium, Baltimore, US, vol. 20, pp. 378-381, (May 16, 1989).

* cited by examiner

*Primary Examiner*—Hemang Sanghavi
(74) *Attorney, Agent, or Firm*—Lee & Morse, P.C.

(57) ABSTRACT

A liquid crystal display device capable of reducing and/or preventing occurrence(s) of retardation remaining in an ECB mode liquid crystal panel may include first and second substrates, first and second orientation films respectively arranged to oppose each other on facing sides of the first and second substrates, and a liquid crystal layer between first and second substrates. The liquid crystal display device may include a first polarizing member formed on a side of the first substrate other than the side on which the first orientation film is formed, a second polarizing member formed on a side of the second substrate other than the side on which the second orientation film is formed, a compensation film formed between the electrically controlled birefringence mode liquid crystal panel and the first polarizing member, or between the electrically controlled birefringence mode liquid crystal panel and the second polarizing member.

20 Claims, 2 Drawing Sheets

LIQUID CRYSTAL DISPLAY DEVICE

BACKGROUND OF THE INVENTION

1. Field of the Invention

The present invention relates to liquid crystal display devices. More particularly, the present invention relates to electrically birefringence (ECB) mode transmissive type liquid crystal display devices.

2. Discussion of Related Art

A liquid crystal display (LCD) device may be classified as a twisted nematic (TN) type, an electrically birefringence (ECB) type, and an optically compensated birefringence (OCB) type according to an operating mode of the LCD device. An LCD device may be further classified as a transmissive LCD device and a reflective LCD device according to a kind of a light source employed by the LCD device. Transmissive type LCD devices may use an internal light source such as a backlight to display images, and reflective type LCD devices may use an external light source such as natural sunlight to display images.

LCD devices having advantages of both transmissive LCD devices and reflective LCD devices are desired. Transflective LCD devices are being researched as LCD devices having advantages of both the transmissive and reflective type LCD devices. Transflective LCD devices generally include an ECB mode liquid crystal panel.

FIG. 1 illustrates a schematic cross-sectional view showing a conventional transflective type LCD device.

As illustrated in FIG. 1, the conventional transflective LCD device may include an electrically controlled birefringence (hereinafter referred to as "ECB") mode liquid crystal panel 100, a first retardation film 110, a first polarizing plate 120, a second retardation film 130, and a second polarizing plate 140. The ECB mode liquid crystal panel 100 may drive one or more liquid crystal cells, and may include first and second substrates 102 and 104, first and second orientation films 103 and 105, which may be provided on opposing inner surfaces of the first and second substrates 102 and 104, respectively, and liquid crystal 107 between the first and second substrates 102 and 104. The first retardation film 110 may be formed on an outer surface of the first substrate 102. The first polarizing plate 120 may be formed on an outer surface of the first retardation film 110. The second retardation film 130 may be formed on an outer surface of the second substrate 104. The second polarizing plate 140 may be formed on an outer surface of the second retardation film 130.

The first and second retardation films 110 and 130 may function to change a polarized state of light. For example, a $\lambda/4$ retardation plate or a $\lambda/2$ retardation plate may be used as the first and second retardation films 110 and 130. A $\lambda/4$ retardation plate may change a line polarization into a circle polarization. A $\lambda/2$ retardation plate may rotate a line polarization or a circle polarization at a predetermined angle. A light transmittance axis of the first polarizing plate 120 may form an angle of 90° with respect to a light transmittance axis of the second polarizing plate 140.

A backlight (not shown) may be arranged on an outer surface of the second polarizing plate 140, e.g., a lower side of the second polarizing plate 140.

In conventional ECB mode transflective LCD devices, as illustrated in FIG. 1, retardation films 120, 130 and polarizing plates 120, 140 are arranged on both upper and lower sides of the ECB mode liquid crystal panel 100, thus, increasing a thickness of such LCD devices. ECB mode liquid crystal panels may generally be employed in transflective type LCD devices.

To embody a transmissive type LCD device using an ECB mode liquid crystal panel with only polarizing plates formed on the liquid crystal panel, retardation state(s) may remain in the ECB mode liquid crystal panel, and a dark state may be difficult and/or impossible to attain.

SUMMARY OF THE INVENTION

The present invention is therefore directed to liquid crystal display devices, which substantially overcome one or more of the problems due to the limitations and disadvantages of the related art.

It is therefore a feature of an embodiment of the present invention to provide a liquid crystal display device that reduces and/or prevents retardation from remaining in an ECB mode liquid crystal panel by respectively providing first and second polarizing members to upper and lower sides of a ECB mode liquid crystal panel, and forming an optical viewing angle compensation film between the first and second polarizing members.

It is therefore a separate feature of an embodiment of the present invention to provide a liquid crystal display device that reduces and/or prevents retardation from remaining in an ECB mode liquid crystal panel by respectively providing first and second polarizing members to upper and lower sides of a ECB mode liquid crystal panel, and forming a retardation film between the first and second polarizing members.

At least one of the above and other features and advantages of the present invention may be realized by providing a liquid crystal display device including an electrically controlled birefringence mode liquid crystal panel for driving a liquid crystal cell, the electrically controlled birefringence mode liquid crystal panel including first and second substrates, first and second orientation films respectively arranged to oppose each other on facing sides of the first and second substrates, and a liquid crystal layer between the first and second substrates, a first polarizing member formed on a side of the first substrate other than the side on which the first orientation film is formed, a second polarizing member formed on a side of the second substrate other than the side on which the second orientation film is formed, and a compensation film formed between the electrically controlled birefringence mode liquid crystal panel and the first polarizing member, or between the electrically controlled birefringence mode liquid crystal panel and the second polarizing member.

The compensation film may include at least one of an optical viewing angle compensation film and a retardation film. The second substrate may include a thin film transistor including a gate electrode and a drain electrode, a passivation layer formed at an upper portion of the thin film transistor, and having a contact hole to expose the drain electrode, and a pixel electrode formed at an upper portion of the passivation layer to be connected to the drain electrode through the contact hole. The first substrate may include black matrices formed at a location corresponding to the thin film transistor formed at the second substrate, a color filter pattern having red, green, and blue filters arranged repeatedly between the black matrices, and an overcoat layer and a common electrode sequentially formed on the color filter pattern. The liquid crystal display device may include a backlight at a lower portion of the second polarizing member. The light transmittance axis of the first polarizing member and a light transmittance axis of the second polarizing member may be inclined by about 35° to about 55° with respect to an orientation direction of the liquid crystal layer included in the electrically controlled birefringence mode liquid crystal panel.

A light transmittance axis of the first polarizing member and a light transmittance axis of the second polarizing member may be inclined by about 45° relative to an orientation direction of the liquid crystal layer included in the electrically controlled birefringence mode liquid crystal panel. The light transmittance axis of the first polarizing member and the light transmittance axis of the second polarizing member may be oriented about 80° to about 100° relative to each other. The light transmittance axis of the first polarizing member and the light transmittance axis of the second polarizing member may be arranged orthogonal to each other.

The compensation film may have a negative retardation. The negative retardation of the compensation film may range from about −60 nm to about −10 nm. The negative retardation of the compensation film is about −35 nm. An optical axis of the optical viewing angle compensation film may be inclined by about −10° to about 10° with respect to an orientation direction of the liquid crystal layer included in the electrically controlled birefringence mode liquid crystal panel. An optical axis of the optical viewing angle compensation film may be arranged horizontal to an orientation direction of the liquid crystal layer included in the electrically controlled birefringence mode liquid crystal panel.

An optical axis of the retardation film may be inclined by about 80° to about 100° with respect to an orientation direction of the liquid crystal layer included in the electrically controlled birefringence mode liquid crystal panel. An optical axis of the retardation film may be arranged orthogonal to an orientation direction of the liquid crystal layer included in the electrically controlled birefringence mode liquid crystal panel. An optical axis of the compensation film and a light transmittance axis of the second polarizing member facing the compensation film may be arranged to be about 35° to about 55° relative to each other. The optical axis of the compensation film and the light transmittance axis of the second polarizing member facing the compensation film may be arranged to be about 45° relative to each other.

At least one of the above and other features and advantages of the present invention may be separately realized by providing a liquid crystal display device including an electrically controlled birefringence mode liquid crystal panel for driving a liquid crystal cell, the electrically controlled birefringence mode liquid crystal panel including first and second substrates, the first and second substrates each having an inner side and an outer side, the inner side of the first substrate facing the inner side of the second substrate, first and second orientation films respectively arranged to oppose each other on the inner sides of the first and second substrates, and a liquid crystal layer between first and second substrates, a first polarizing member formed on a side of the first substrate other than the side on which the first orientation film is formed, a second polarizing member formed on a side of the second substrate other than the side on which the second orientation film is formed, and a compensation film arranged on only one of the outer side of the first substrate and the outer side of the second substrate.

At least one of the above and other features and advantages of the present invention may be separately realized by providing a transmissive liquid crystal display device including an electrically controlled birefringence mode liquid crystal panel for driving a liquid crystal cell, a first polarizing member formed on a first side of the electrically controlled birefringence mode liquid crystal panel, a second polarizing member formed on a second side of the electrically controlled birefringence mode liquid crystal panel, a light providing member arranged on one of the first side and the second side of the electrically controlled birefringence mode liquid crystal panel, and a compensation film formed on only one of the first side and the second side of the electrically controlled birefringence mode liquid crystal panel.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
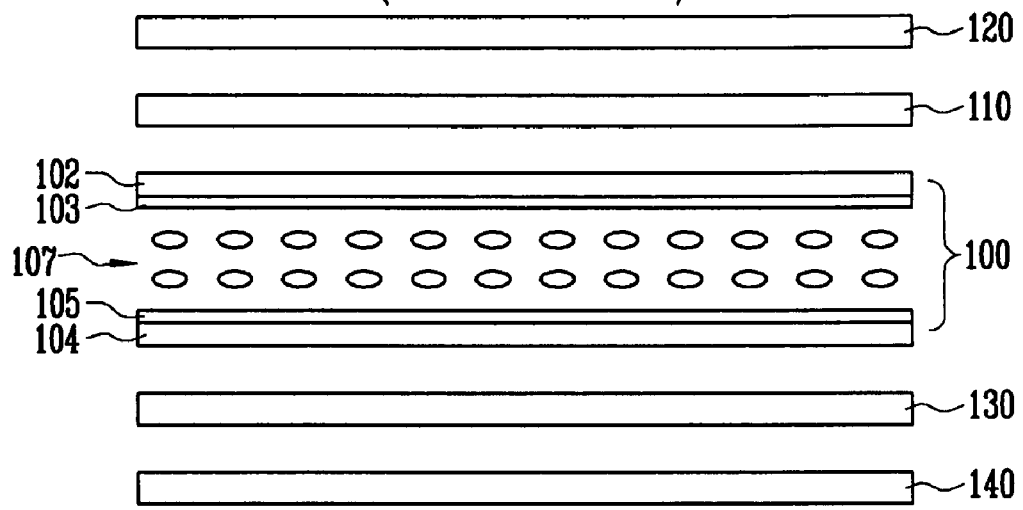
FIG. 1 illustrates a schematic cross-sectional view of a conventional transflective LCD device.

Korean Patent Application No. 2005-92317, filed on Sep. 30, 2005, in the Korean Intellectual Property Office, and entitled: "Liquid Crystal Display Device," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
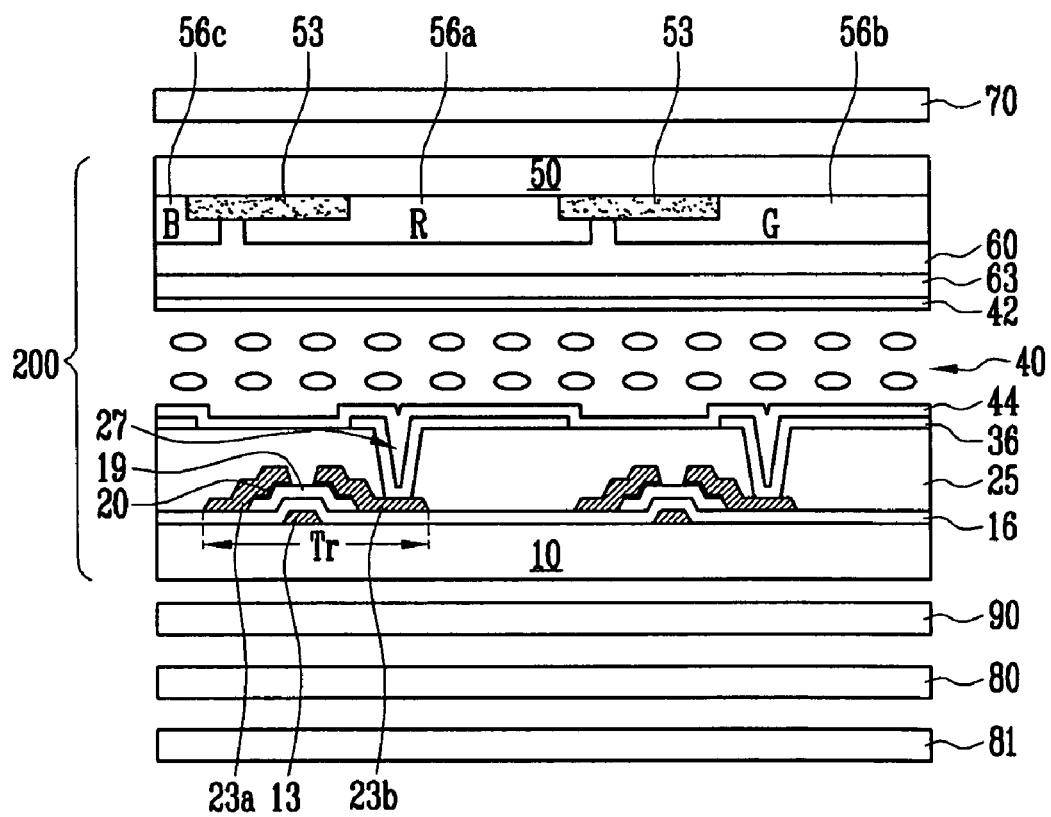
FIG. 2 illustrates a cross-sectional view of a LCD device according to an embodiment of the present invention.

FIG. 2 illustrates a cross-sectional view of a LCD device according to an embodiment of the present invention.

As illustrated in FIG. 2, the LCD device according to an embodiment of the present invention may include an ECB mode liquid crystal panel 200, a first polarizing member 70, a second polarizing member 80 and a compensation film 90. The first polarizing member 70 and the second polarizing member 80 may be plate-like members. The ECB mode liquid crystal panel 200 may drive one or more liquid crystal cells. The ECB mode liquid crystal panel 200 may include first and second substrates 50 and 10, first and second orientation films 42 and 44, and a liquid crystal layer 40. The first and second orientation films 42, 44 may be arranged on opposing inner sides of the first and second substrates 50 and 10, i.e., surface or sides of the first and second substrates 50 and 10 that face each other. The liquid crystal layer 40 may be provided between first and second substrates 50 and 10. The first polarizing member 70 may be arranged on an outer surface of the first substrate 50, i.e., surface of first substrate 50 that does not face the second substrate 10. The second polarizing member 80 may be formed on an outer surface of the second substrate 10, i.e., surface of the second substrate 10 that does not face the first substrate 50. The compensation film 90 may be formed between the ECB mode liquid crystal panel 200 and the second polarizing member 80.

The first substrate 50 and the second substrate 10 may be arranged overlapping each other with a space therebetween. A thin film transistor Tr may be formed on the second substrate 10, and may be composed of a gate electrode 13, a source electrode 23a, and a drain electrode 23b. The thin film transistor Tr may include an active layer 19 and an ohmic contact layer 20. A gate insulation film 16 may be formed on the gate electrode 13 and/or the second substrate 10.

A passivation layer 25 may be formed on the thin film transistor Tr, and may cover the thin film transistor Tr. The passivation layer 25 may include a contact hole 27 to expose the drain electrode 23b. A pixel electrode 36 may be formed on the passivation layer 25, and may be connected to the drain electrode 23b via the contact hole 27.

As illustrated in FIG. 2, black matrices 53 may be formed on an inner surface of the first substrate 50. The black matrices 53 may be formed on portions of the inner surface of the first substrate 50 that overlap the thin film transistor Tr. Color filter patterns 56a, 56b, 56c may be arranged on and/or between the black matrices 53. The color filter patterns 56a, 56b, 56c may correspond to red, green, and blue filters, respectively. One of the color filter patterns 56a, 56b, 56c may be arranged between the black matrices 53, and a pattern corresponding to a set including one of each of the color filter patterns may be repeated. An overcoat layer 60 and a common electrode 63 may be successively formed on a lower side of the color filter patterns 56a, 56b, 56c. The common electrode 63 may be made of transparent conductive materials. One of the color filter patterns 56a, 56b, 56c, i.e., one color, may correspond to one of the pixel electrodes 36.

The first and second orientation films 42 and 44 may be formed on inner sides of the first and second substrates 50 and 10, respectively. The first orientation film 42 and the second orientation film 44 may be orientated in a direction opposite to each other.

The liquid crystal layer 40 may be provided between the first and second orientation films 42 and 44. When a voltage is applied to the pixel electrode 36 and the common electrode 63, liquid crystal molecules of the liquid crystal layer horizontally orientated by the first and second orientation films 42 and 44 may be changed in an aligned state by an electric field generated between the pixel and common electrodes 36 and 63, thereby driving the liquid crystal display device.

A transmissive type LCD device may include a light source such as, e.g., a backlight. Although it is not illustrated, a backlight 81 may be arranged on a lower side of the second polarizing member 80. Light from the backlight 81 may be incident on a liquid crystal panel 200 that controls an amount of the light transmitted, based on an alignment of the liquid crystal, thereby displaying an image.

The ECB mode liquid crystal panel 200 according to an embodiment of the present invention may have first and second orientation films 42 and 44, which may be orientated opposite to each other on inner sides of the first and second substrates 50 and 10. The liquid crystal layer 40 may be formed between the first and second substrates 50 and 10. The liquid crystal in the liquid crystal layer 40 may be horizontally orientated by the first and second orientation films 42 and 44. When a voltage is applied to the pixel electrode 36 and the common electrode 63, liquid crystal molecules in the liquid crystal layer 40 may change orientation as a result of an electric field generated between the pixel electrode 36 and the common electrode 63, and the LC display device may be driven.

In embodiments of the invention, a transmissive type LCD device may be embodied with an ECB mode liquid crystal panel 200.

In embodiments of the invention, first and second polarizing members 70 and 80 may be provided at upper and lower sides of the ECB mode liquid crystal panel 200, e.g., upper side of first substrate 50 and lower side of second substrate 10. The compensation film 90 may be formed between the ECB mode liquid crystal panel 200 and the second polarizing member 80. For example, the compensation film 90 may be formed between the lower side of the second substrate 10 and an upper side of the second polarizing member 80. In embodiments of the invention, the occurrence of retardation remaining in the ECB mode liquid crystal panel 200 may be reduced and/or prevented by employing, e.g., the compensation film 90, and a contrast and/or a viewing angle of the LCD device may be improved. In embodiments of the invention, it is not necessary to provide first and/or second retardation films. Accordingly, thickness of such LCD devices may be less than LCD devices employing both first and second retardation films and first and second polarizing members. In embodiments of the invention, the compensation film 90 may be provided between the first polarizing member 70 and the first substrate 50 and/or between the second polarizing member 80 and the second substrate 10.

The compensation film 90 may be composed of an optical viewing angle compensation film and/or a retardation film.

A light transmittance axis of the first polarizing member 70 and a light transmittance axis of the second polarizing member 80 may be inclined by, e.g., about 35° to about 55°, including exactly 35° and exactly 55°. For example, a light transmittance axis of the first polarizing member 70 and a light transmittance axis of the second polarizing member 80 may be about or exactly 45° with respect to an orientation direction of the liquid crystal layer 40 of the ECB mode liquid crystal panel 200.

The light transmittance axis of the first polarizing member 70 and the light transmittance axis of the second polarizing member 80 may be, e.g., about 80° to about 100°, including exactly 80° and exactly 100°, relative to each other. In embodiments of the invention, light transmittance axis of the first polarizing member and the light transmittance axis of the second polarizing member may be arranged approximately or exactly orthogonal (90°) to each other.

In embodiments of the invention, the compensation film 90 may be formed between the ECB mode liquid crystal panel 200 and the second polarizing member 80, e.g., between the second substrate 10 and the second polarizing member 80. In embodiments of the invention, a negative retardation of the compensation film 90 may range, e.g., from about −60 nm to about −10 nm, including exactly −60 nm and exactly −10 nm. For example, the negative retardation of the compensation film 90 may be about or exactly −35 nm.

In embodiments of the invention in which the compensation film 90 is an optical viewing angle compensation film, an optical axis of such an optical viewing angle compensation film may be inclined by, e.g., about −10° to about 10°, including exactly −10° and exactly 10°, with respect to an orientation direction of the liquid crystal layer 40 of the ECB mode liquid crystal panel 200. For example, in embodiments of the invention in which the compensation film 90 is provided in the form of an optical viewing angle compensation film, an optical axis of the compensation film 90 may be horizontal to an orientation direction of the liquid crystal layer 40. In embodiments of the invention in which the compensation film 90 is provided in the form of a retardation film, an optical axis of the compensation film 90 may be inclined by, e.g., about 80° to about 100°, including exactly 80° and exactly 100°, with respect to an orientation direction of the liquid crystal layer 40 of the ECB mode liquid crystal panel 200. For example, in embodiments of the invention in which the compensation film 90 is provided in the form of a retardation film, an optical axis of the compensation film may be inclined exactly or about 90° with respect to the orientation direction of the liquid crystal layer 40.

In embodiments of the invention, an optical axis of the compensation film 90 and a light transmittance axis of the first polarizing member 70 facing the compensation film 90 may be arranged to have, e.g., about 35° to about 55°, including exactly 35° and exactly 55°, relative to each other. For example, in embodiments of the invention, the optical axis of the compensation film 90 and the light transmittance axis of the first polarizing member 70 facing the compensation film 90 may be exactly or about 45° relative to each other.

Figure 3:
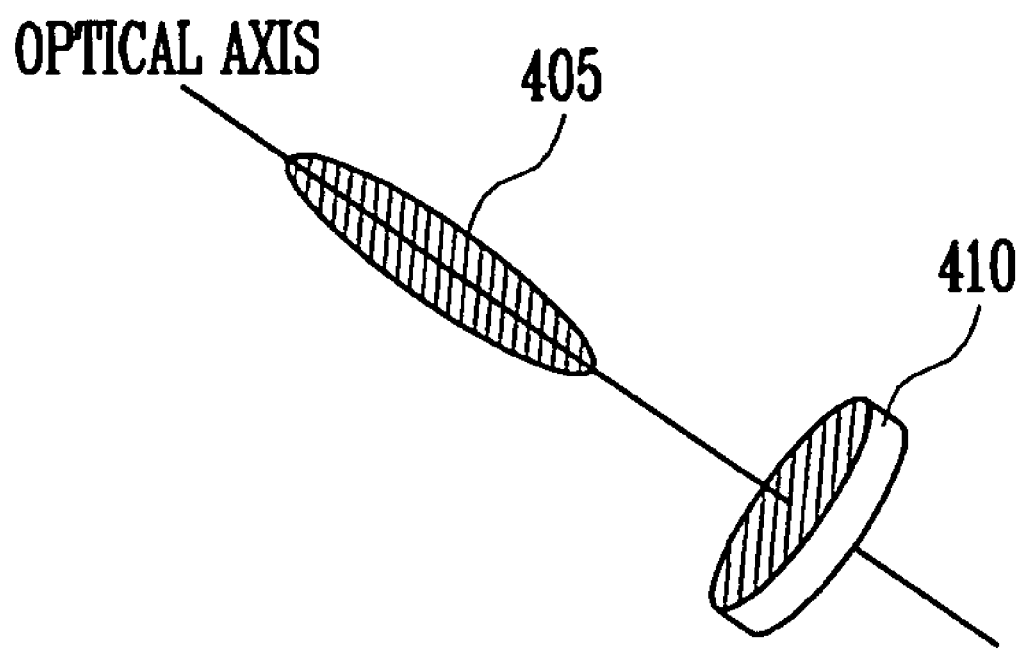
FIG. 3 illustrates a diagram of a molecular orientation of an optical view angle compensation film employable in an LCD device, according to one or more aspects of the present invention.

FIG. 3 illustrates an exemplary diagram of a molecular orientation of an optical view angle compensation film employable in an LCD device, according to one or more aspects of the present invention. Although an optical view angle compensation film according to an embodiment of the invention is described with reference to FIG. 3, the present invention is not limited thereto.

In embodiments of the invention, in which the compensation film 90 is an optical viewing angle compensation film, the compensation film 90 may have an internal structure in which optical axes of a nematic liquid crystal molecule 405 and a discotic liquid crystal molecule 410 are identically arranged. Such an internal structure may at least partially and possibly completely compensate for a variation of the retardation with respect to a moving direction of light having permeated the ECB mode liquid crystal panel 200.

The nematic liquid crystal molecule 405 may be a positive uniaxial material. An extraordinary refractive index $n_e$ of the nematic liquid crystal molecule 405 may be greater than an ordinary refractive index $n_0$ thereof.

In contrast to this, the discotic liquid crystal molecule 410 may be a negative uniaxial material. An extraordinary refractive index $n_e$ of the nematic liquid crystal molecule 410 may be less than an ordinary refractive index $n_0$ thereof.

In embodiments of the invention, by attaching first and second polarizing members to upper and lower sides of the ECB mode liquid crystal panel, and forming a compensation film, e.g., a retardation film or an optical viewing angle compensation film, between the second substrate and the polarizing member, an occurrence of remaining retardation in an ECB mode liquid crystal panel may be reduced and/or prevented, thereby improving a contrast and a viewing angle of the LCD device.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display device, comprising:
   an electrically controlled birefringence mode liquid crystal panel for driving a liquid crystal cell, the electrically controlled birefringence mode liquid crystal panel including:
      first and second substrates, first and second orientation films respectively arranged to oppose each other on facing sides of the first and second substrates, and
      a liquid crystal layer between the first and second substrates;
   a first polarizing member formed on a side of the first substrate other than the side on which the first orientation film is formed;
   a second polarizing member formed on a side of the second substrate other than the side on which the second orientation film is formed; and
   a compensation film formed between only one of the electrically controlled birefringence mode liquid crystal panel and the first polarizing member or between the electrically controlled birefringence mode liquid crystal panel and the second polarizing member, wherein an optical axis of the compensation film and a light transmittance axis of the second polarizing member facing the compensation film are arranged to be about 35° to about 55° relative to each other.

2. The liquid crystal display device as claimed in claim 1, wherein the compensation film comprises at least one of an optical viewing angle compensation film and a retardation film.

3. The liquid crystal display device as claimed in claim 1, wherein the second substrate includes:
   a thin film transistor including a gate electrode and a drain electrode;
   a passivation layer formed at an upper portion of the thin film transistor, and having a contact hole to expose the drain electrode; and
   a pixel electrode formed at an upper portion of the passivation layer to be connected to the drain electrode through the contact hole.

4. The liquid crystal display device as claimed in claim 1, wherein the first substrate includes:
   black matrices formed at a location corresponding to the thin film transistor formed at the second substrate;
   a color filter pattern having red, green, and blue filters arranged repeatedly between the black matrices; and
   an overcoat layer and a common electrode sequentially formed on the color filter pattern.

5. The liquid crystal display device as claimed in claim 1, further comprising a backlight at a lower portion of the second polarizing member.

6. The liquid crystal display device as claimed in claim 1, wherein a light transmittance axis of the first polarizing member and a light transmittance axis of the second polarizing member are inclined by about 35° to about 55° with respect to an orientation direction of the liquid crystal layer included in the electrically controlled birefringence mode liquid crystal panel.

7. The liquid crystal display device as claimed in claim 6, wherein a light transmittance axis of the first polarizing member and a light transmittance axis of the second polarizing member are inclined by about 45° relative to an orientation direction of the liquid crystal layer included in the electrically controlled birefringence mode liquid crystal panel.

8. The liquid crystal display device as claimed in claim 1, wherein the light transmittance axis of the first polarizing member and the light transmittance axis of the second polarizing member are oriented about 80° to about 100° relative to each other.

9. The liquid crystal display device as claimed in claim 8, wherein the light transmittance axis of the first polarizing member and the light transmittance axis of the second polarizing member are arranged orthogonal to each other.

10. The liquid crystal display device as claimed in claim 1, wherein the compensation film has a negative retardation.

11. The liquid crystal display device as claimed in claim 10, wherein the negative retardation of the compensation film ranges from about −60 nm to about −10 nm.

12. The liquid crystal display device as claimed in claim 11, wherein the negative retardation of the compensation film is about −35 nm.

13. The liquid crystal display device as claimed in claim 2, wherein an optical axis of the optical viewing angle compensation film is inclined by about −10° to about 10° with respect to an orientation direction of the liquid crystal layer included in the electrically controlled birefringence mode liquid crystal panel.

14. The liquid crystal display device as claimed in claim 13, wherein an optical axis of the optical viewing angle compensation film is arranged horizontal to an orientation direction of the liquid crystal layer included in the electrically controlled birefringence mode liquid crystal panel.

15. The liquid crystal display device as claimed in claim 2, wherein an optical axis of the retardation film is inclined by about 80° to about 100° with respect to an orientation direction of the liquid crystal layer included in the electrically controlled birefringence mode liquid crystal panel.

16. The liquid crystal display device as claimed in claim 15, wherein an optical axis of the retardation film is arranged orthogonal to an orientation direction of the liquid crystal layer included in the electrically controlled birefringence mode liquid crystal panel.

17. The liquid crystal display device as claimed in claim 1, wherein the optical axis of the compensation film and the light transmittance axis of the second polarizing member facing the compensation film are arranged to be about 45° relative to each other.

18. A liquid crystal display device, comprising:
   an electrically controlled birefringence mode liquid crystal panel for driving a liquid crystal cell, the electrically controlled birefringence mode liquid crystal panel including:
      first and second substrates, the first and second substrates each having an inner side and an outer side, the inner side of the first substrate facing the inner side of the second substrate,
      first and second orientation films respectively arranged to oppose each other on the inner sides of the first and second substrates, and
      a liquid crystal layer between first and second substrates;
   a first polarizing member formed on a side of the first substrate other than the side on which the first orientation film is formed;
   a second polarizing member formed on a side of the second substrate other than the side on which the second orientation film is formed; and
   a compensation film arranged on only one of the outer side of the first substrate and the outer side of the second substrate, wherein an optical axis of the compensation film and a light transmittance axis of the second polarizing member facing the compensation film are arranged to be about 35° to about 55° relative to each other.

19. A transmissive liquid crystal display device, comprising:
   an electrically controlled birefringence mode liquid crystal panel for driving a liquid crystal cell;
   a first polarizing member formed on a first side of the electrically controlled birefringence mode liquid crystal panel;
   a second polarizing member formed on a second side of the electrically controlled birefringence mode liquid crystal panel;
   a light providing member arranged on one of the first side and the second side of the electrically controlled birefringence mode liquid crystal panel; and
   a compensation film formed on only one of the first side and the second side of the electrically controlled birefringence mode liquid crystal panel, wherein an optical axis of the compensation film and a light transmittance axis of the second polarizing member facing the compensation film are arranged to be about 35° to about 55° relative to each other.

20. The liquid crystal display device as claimed in claim 2, wherein the compensation film includes an optical viewing angle compensation film, the optical viewing angle compensation film including a discotic liquid crystal molecule.

* * * * *